United States Patent
Murphy

(10) Patent No.: US 8,958,932 B2
(45) Date of Patent: Feb. 17, 2015

(54) METHODS AND APPARATUS TO MITIGATE INSTRUMENT LANDING SYSTEM OVERFLIGHT INTERFERENCE

(71) Applicant: The Boeing Company, Chicago, IL (US)

(72) Inventor: Tim Murphy, Everett, WA (US)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 13/764,422

(22) Filed: Feb. 11, 2013

(65) Prior Publication Data

US 2014/0229039 A1    Aug. 14, 2014

(51) Int. Cl.
| | |
|---|---|
| G05D 1/06 | (2006.01) |
| B64D 45/04 | (2006.01) |
| G01C 21/16 | (2006.01) |
| G01S 3/02 | (2006.01) |
| G01S 3/28 | (2006.01) |

(52) U.S. Cl.
CPC .............. *B64D 45/04* (2013.01); *G01C 21/165* (2013.01); *G01S 3/023* (2013.01); *G01S 3/28* (2013.01)
USPC ............ 701/17; 701/3; 701/4; 701/7; 701/14; 701/16; 701/500; 701/504; 340/945

(58) Field of Classification Search
USPC .......................... 701/3–18, 500, 504; 340/945
See application file for complete search history.

(56) References Cited

U.S. PATENT DOCUMENTS

| | | | |
|---|---|---|---|
| 6,178,363 | B1 | 1/2001 | McIntyre et al. |
| 6,549,829 | B1 | 4/2003 | Anderson et al. |
| 6,845,304 | B1 | 1/2005 | Young |
| 7,970,503 | B2 | 6/2011 | Lapp et al. |
| 8,239,077 | B2 | 8/2012 | Colomer |
| 2009/0069960 | A1 | 3/2009 | Lapp et al. |

OTHER PUBLICATIONS

European Patent Office, "Extended European Search Report," issued in connection with Application No. 14154378.5, Apr. 17, 2014, 8 pages.

Bleeg et al., "Inertially Augmented Automatic Landing System: Autopilot Performance With Imperfect ILS Beams", Prepared for Department of Transportation Federal Aviation Administration Systems Research & Development Service, Apr. 1972, (242 pages).

(Continued)

*Primary Examiner* — Adam Tissot
(74) *Attorney, Agent, or Firm* — Hanley, Flight & Zimmerman, LLC

(57) ABSTRACT

Systems and methods to mitigate instrument landing system (ILS) overflight interference are disclosed. An example method performing a first measurement of a position of an aircraft relative to a first location based on an instrument landing system, performing a second measurement of the position of the aircraft based on inertial measurements performed over a first time period occurring prior to the first measurement, performing a third measurement of the position of the aircraft based on inertial measurements performed over a second time period greater than the first time period and occurring prior to the first measurement, and generating guidance information based on a selected one of the first, second, or third measurements of the position of the aircraft.

20 Claims, 10 Drawing Sheets

(56) References Cited

OTHER PUBLICATIONS

"Global Navigation Satellite System (GNSS) Manual", International Civil Aviation Organization, Approved by the Secretary General and published under his authority, First Edition, Document 9849 AN/457, 2005, (69 pages).

"Status Report: BFU EX010-11", Bundesstell fur Flugunfalluntersuchung, German Federal Bureau of Aircraft Accident Investigation, Nov. 3, 2011, (14 pages).

METHODS AND APPARATUS TO MITIGATE INSTRUMENT LANDING SYSTEM OVERFLIGHT INTERFERENCE

BACKGROUND

Instrument landing systems (ILSs) provide navigation guidance to landing aircraft. Generally, an ILS includes a localizer to provide lateral navigation and a glidescope to provide guidance for descent to a runway threshold. Both the localizer and the glidescope emit signals, which are received by incoming aircraft and translated to navigation information.

The signals of prior art ILSs are subject to interference from a variety of sources including multipath. Multipath occurs when the transmitted signals travel between the ground-based transmitter and airborne receiver via multiple paths due to reflections or diffractions of the signal. Such multipath interference may occur when an aircraft is taking off and flies over the localizer, thereby becoming a source of reflection or refraction of the localizer signal received by another airplane on approach. When ILS signals are received via multiple paths, the signals add constructively or destructively at the receiver antenna resulting in a distortion of the guidance signal. In this way, multipath interference in ILS signals received by prior art ILS receivers in aircraft can cause the ILS signals to appear as though the aircraft is moving laterally with respect to the runway centerline even if no such lateral movement of the aircraft is occurring. Accordingly, there is a need for mitigation of ILS overflight interference.

SUMMARY

Methods and apparatus to mitigate instrument landing system overflight interference are disclosed. An example method includes performing a first measurement of a position of an aircraft relative to a first location based on an instrument landing system, performing a second measurement of the position of the aircraft based on inertial measurements performed over a first time period occurring prior to the first measurement, performing a third measurement of the position of the aircraft based on inertial measurements performed over a second time period greater than the first time period and occurring prior to the first measurement, and generating guidance information based on a selected one of the first, second, or third measurements of the position of the aircraft.

An example apparatus includes an instrument landing system to perform a first measurement of a position of an aircraft relative to a first location, an inertial reference unit to perform inertial measurements of a change in location of the aircraft, and a position selector to select between the first measurement, a second measurement of the position of the aircraft based on the inertial measurements over a first time period occurring prior to the first measurement, and a third measurement of the position of the aircraft based on the inertial measurements performed over a second time period greater than the first time period and occurring prior to the first measurement, and to generate guidance information based on a selected one of the first, second, or third measurements of the position of the aircraft.

The features, functions, and advantages that have been discussed can be achieved independently in various embodiments or may be combined in yet other embodiments, further details of which can be seen with reference to the following description and drawings.

DETAILED DESCRIPTION

Figure 1:
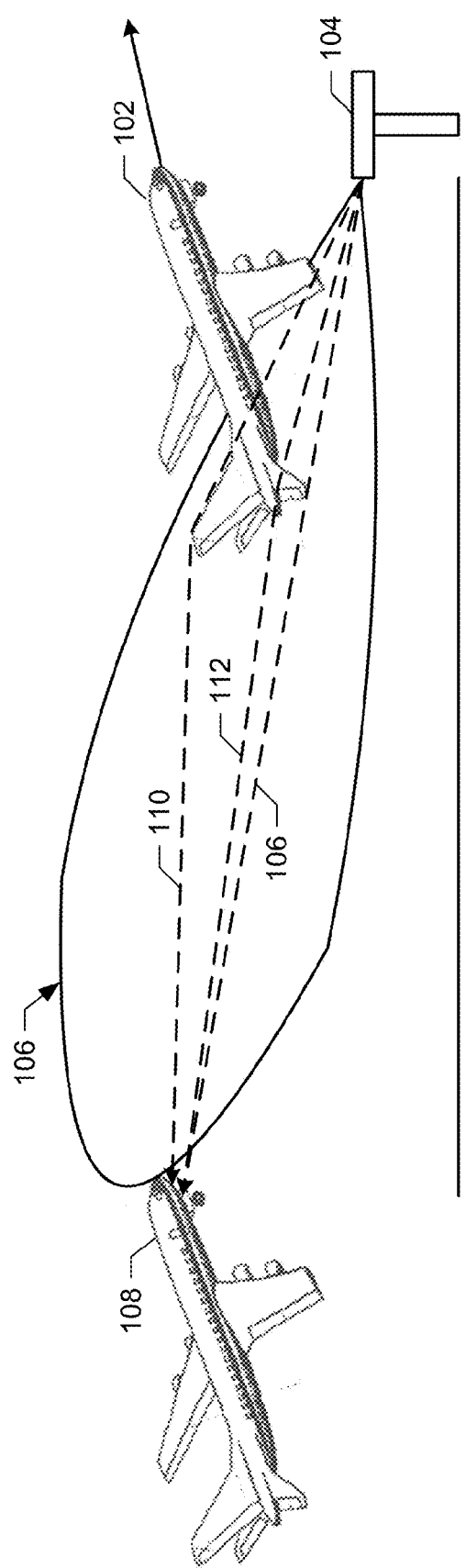
FIG. 1 illustrates an example situation in which an aircraft may experience interference from an overflight of an instrument landing system localizer array.

FIG. 1 illustrates an example situation in which an aircraft may experience interference from an overflight of an instrument landing system localizer array. ILS overflight interference (also referred to herein as overflight interference) occurs when a first aircraft 102 takes off, flies over the ILS localizer 104, and disturbs the guidance signals 106 (e.g., direct ray signals) emitted by the localizer 104 while a second aircraft 108 is on approach. The guidance signal disturbance results from reflected signals 110 and/or refracted signals 112 induced by the first aircraft 102 acting as a reflector and/or refractor for signals received by the second aircraft 108. The multiple signals 106, 110, 112 received by the second aircraft 108 will be added, resulting in distortion of the signal relative to what should have been received by the second aircraft 108. Overflight interference can be particularly problematic if the second airplane 108 is in the final stages of the approach nearing the runway, as the overflight disturbance can cause unwanted excursions in airplane roll.

Example methods and apparatus disclosed herein use a combination of ILS guidance and navigation system measurements (e.g., global positioning system (GPS) or other satellite-based guidance, inertial measurement, etc.) to detect and mitigate the effects of ILS overflight interference. Some example methods and apparatus disclosed herein translate lateral deviations obtained via an ILS system to a rectilinear reference grid. In some example methods and apparatus, the reference grid is obtained based on GPS measurements of the position of the aircraft with respect to the position of the runway threshold. Example methods and apparatus further obtain acceleration and/or velocity measurements from an inertial reference unit (IRU) of the aircraft.

In example methods and apparatus, the measurements from the IRU are stored in one or more first-in-first-out (FIFO) buffers. The example buffer(s) store measurements for a first time period and a second time period. The first time period may be chosen to be the longest expected duration of a signal disturbance caused by overflight interference. The second time period may be chosen to be a period of time sufficiently long to reliably detect the presence of an overflight signal disturbance. Some examples can include more measurements of aircraft position by setting additional time intervals of ILS guidance propagated forward in time and combined with integrated inertial measurements.

Example methods and apparatus propagate forward (or coast) ILS derived position estimates made at some relative times in the past (e.g., X seconds prior to the present time, which advances as the present time advances) to the present time through integration of acceleration and/or velocity measurements made over the corresponding time intervals (e.g., from the time of the measurement to the present time). In some examples, an ILS-derived position from a first time in the past is propagated forward by integration of inertial measurements over a first time period (e.g., from the first time in the past to the present time) to calculate a first position estimate (e.g., according to the reference grid). An ILS derived position from a second time in the past is propagated forward by integration of inertial measurements over a corresponding second time period (e.g., from the second time in the past to the present time) to calculate a second position (e.g., according to the reference grid). The example methods and apparatus disclosed herein may then select between the position determined from the ILS, the first position based on propagating the past ILS measurements forward for a first time period, and the second position based on propagating the past ILS measurements forward for a second time period to mitigate the effects of ILS overflight interference. Example methods and apparatus disclosed herein detect and/or mitigate bias errors present in the IRU measurements.

Figure 2:
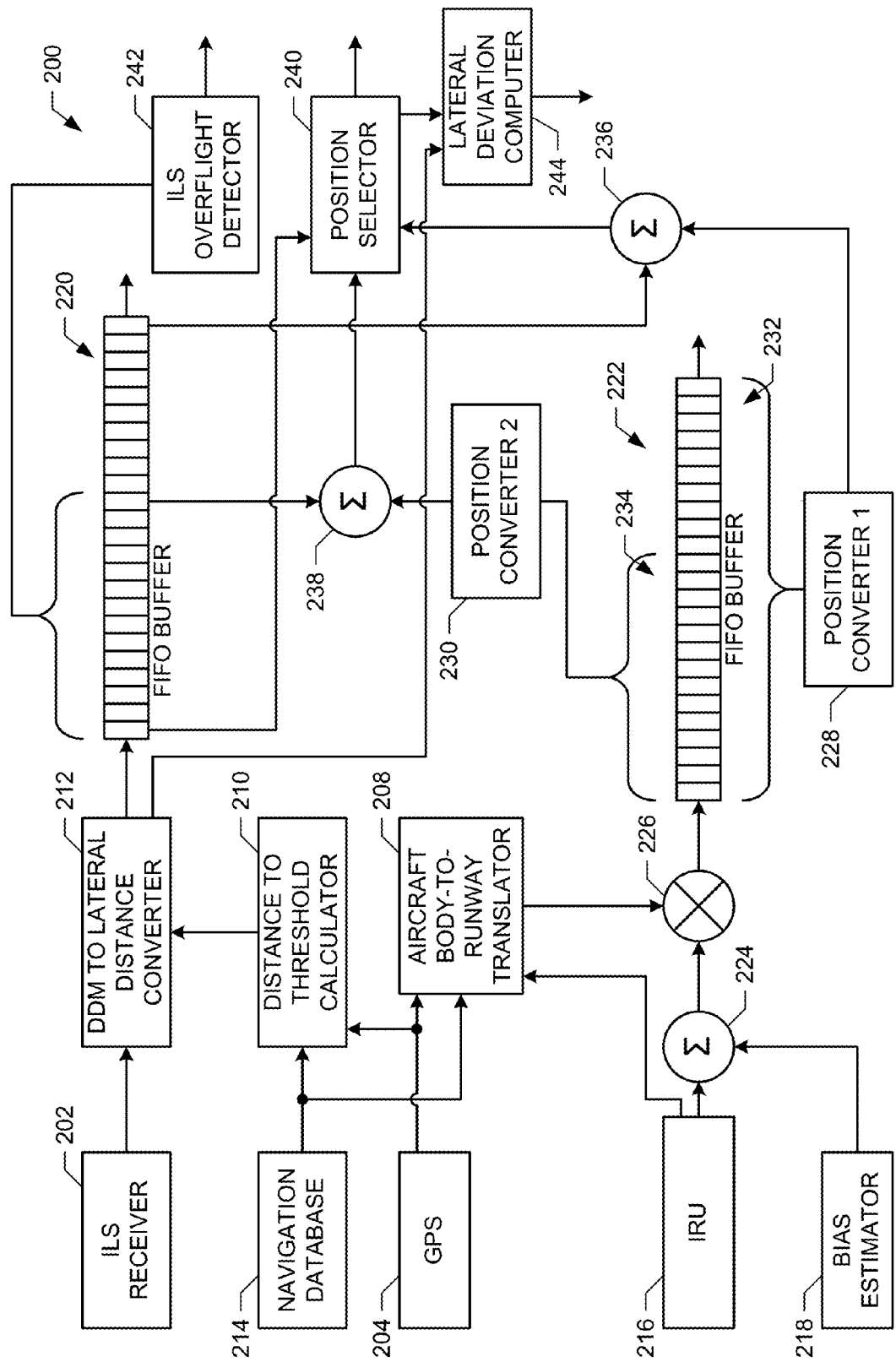
FIG. 2 is a block diagram of an example apparatus to mitigate overflight interference of an instrument landing system.

FIG. 2 is a block diagram of an example apparatus 200 to mitigate overflight interference of an ILS. The example apparatus 200 of FIG. 2 may be implemented in an aircraft such as the aircraft 102 and/or 108 of FIG. 1.

The example apparatus 200 of FIG. 2 includes an ILS receiver 202 to perform ILS measurements including lateral deviation measurements. The example ILS receiver 202 is a first source of guidance measurements in the example apparatus 200. The ILS lateral deviations measured by the ILS receiver 202 are used to navigate the aircraft during landing, and may be corrupted by multipath due to overflight interference and/or other sources of disturbance.

The example apparatus 200 of FIG. 2 further includes a global positioning system (GPS) transceiver 204. The GPS transceiver 204 may be augmented or replaced by any other suitable satellite-based positioning system. The example GPS transceiver 204 provides a position for the aircraft (e.g., latitude, longitude, and altitude of the aircraft) to an aircraft body-to-runway reference translator 208, a distance to threshold calculator 210, and a difference in the depth of modulation (DDM) to lateral distance converter 212.

The apparatus 200 further includes a navigation database 214. The example navigation database 214 stores navigation data, including the position information (e.g., latitudes, longitudes, and/or altitudes) for various locations for use in piloting the aircraft. In some examples, the navigation database 214 is part of a flight management system of the aircraft. In the example of FIG. 2, the navigation database 214 includes the position information (e.g., latitude, longitude, and/or altitude) of a runway threshold (e.g., the start or front of the runway surface, when the aircraft is landing, at the centerline of the runway) for the runway (a "target runway") to which the aircraft is travelling, a runway on which the aircraft is to land, and/or a runway corresponding to the ILS signals received by the ILS receiver 202. The example navigation database 214 may further include information indicating a heading of the runway (e.g., a direction of the runway centerline relative to true north). Additionally or alternatively, the runway position information may be received via the GPS transceiver 204 as part of the standard "Final Approach Segment" (FAS) data block that is used by both the Satellite Based Augmentation System (SBAS) and the Ground Based Augmentation System (GBAS).

The example distance to the threshold calculator 210 of FIG. 2 estimates the distance between the aircraft's current position and the threshold of the target runway. In the example of FIG. 2, the distance to the threshold calculator 210 estimates the distance to the threshold in a rectilinear coordinate system having its origin at the runway threshold and the x-axis aligned with the centerline. The example distance to the threshold calculator 210 may obtain the coordinate system, the location of the origin, and/or the location and/or direction of the centerline (e.g., two or more points defining the centerline) from the navigation database 214 of FIG. 2. The estimate of the distance to the threshold is the magnitude of the x-axis component of the vector between the airplane position and the runway threshold in the coordinate frame associated with the runway.

The example DDM to lateral distance converter 212 of FIG. 2 obtains the estimate of the distance to the threshold from the distance to the threshold calculator 210 and the ILS lateral deviation measurements from the ILS receiver 202. In the example of FIG. 2, the distance to the threshold calculator 210 provides position information for the aircraft with reference to the runway reference frame. The DDM to lateral distance converter 212 converts the lateral deviation measurements from the angular coordinate system used by the ILS receiver 202 to a rectilinear coordinate system fixed to the runway (e.g., lateral distance from the runway centerline).

The computation of the lateral deviations expressed in the rectilinear reference coordinate frame of FIG. 2 may be susceptible to inaccuracies due to errors in the position measured by the GPS transceiver 204. However, lateral deviations may be translated into the angular frame using the same information used to convert to the rectilinear reference grid, substantially canceling the contribution of the errors due to the GPS transceiver 204.

The example apparatus 200 of FIG. 2 includes an IRU 216 (or an inertial measurement unit (IMU)). The example IRU 216 of FIG. 2 measures acceleration and/or velocity of the body of the aircraft. An estimate of the change in the position of the aircraft over some time period can be obtained by single integration of velocity measurements and/or by double integration of acceleration measurements over the corresponding time periods. The example IRU 216 references the acceleration and/or velocity measurements to the body frame of the aircraft and/or in an earth fixed reference frame (e.g., North East Down (NED), East North Up (ENU), etc.) frame as defined at the position of the aircraft. In the example of FIG. 2, the IRU 216 generates and/or translates the measurements with reference to the body frame of the aircraft to enable acceleration and/or velocity bias error corrections to be applied.

The example aircraft body-to-runway translator 208 obtains the runway true heading (e.g., from the navigation database 214), the location of the runway (e.g., from the navigation database 214), and the position of the aircraft (e.g., from the GPS transceiver 204), and generates a translation matrix that translates 3-dimensional vectors from a reference with respect to the body of the aircraft to a reference frame fixed to the runway. The example translator 208 of FIG. 2 produces a transformation matrix that may be used to transform the inertial measurements from an aircraft body-centric reference (e.g., x, y, z coordinates with respect to the aircraft body) to a reference frame fixed to the runway (e.g., x, y, z coordinates with respect to a coordinate frame with the origin at the intersection of the runway threshold and centerline and the x-axis aligned with the runway centerline and the z axis aligned with local vertical).

Once translated into the rectilinear form in the runway coordinate frame, the position measurements generated by the ILS receiver 202 are stored in a buffer 220. Similarly, after translation to the runway coordinate frame, measurements from the IRU 216 of FIG. 2 are stored in a buffer 222. The example buffers 220, 222 of FIG. 2 are First In First Out (FIFO) memory buffers that are large enough to hold enough samples to correspond to a first amount (e.g., N1 seconds) of time. Thus, the example apparatus 200 stores the most recent N1 seconds of lateral deviation measurement data. The terms "lateral deviation" and "lateral position" are used interchangeably herein. The buffers 220, 222 may store $N1/\Delta T$ samples, where $\Delta T$ is the sampling interval of the data. After N1 seconds, a sample of lateral deviation measurement data flows out of the FIFO buffers 220, 222 and is no longer retained in memory. The example FIFO buffers 220, 222 may also be referred to herein as Lateral Deviation History Buffers and/or simply buffers.

The example buffer 220 of FIG. 2 receives and stores lateral deviation measurements obtained from the DDM to the lateral distance converter 212. Thus, the example buffer 220 of FIG. 2 stores lateral deviation measurements derived from the ILS receiver 202. In contrast, the example buffer 222 of FIG. 2 stores acceleration or velocity measurements from the IRU 216. Prior to being stored in the buffer 222, the biases of the IRU 216 are estimated and removed from acceleration measurements obtained from the example IRU 216 via a summer 224 (or subtractor). After removing the biases, the example acceleration measurements are translated to the runway reference by multiplying the vector of accelerations by a transformation matrix obtained from the translator 208. The translation or transformation process is illustrated by the multiplier 226 in FIG. 2. Accordingly, the example buffer 222 of FIG. 2 stores N1 seconds of acceleration measurements derived from the IRU 216 after translation into the runway coordinate frame.

The example apparatus 200 of FIG. 2 includes a first position converter 228 and a second position converter 230. The position converters 228, 230 convert different numbers 232, 234 of the stored acceleration measurements in the buffer 222 to respective distances. For example, the first position converter 228 of FIG. 2 converts N1 seconds of acceleration measurements (e.g., the most recent N1 seconds of acceleration measurements) to a distance by double-integrating the measurements, thereby obtaining a distance representative of a change in position of the aircraft during the N1 seconds. Similarly, the example second position converter 230 of FIG. 2 converts N2 seconds of acceleration measurements (e.g., the most recent N2 seconds of acceleration measurements) to a distance by double-integrating the measurements to obtain a change in position of the aircraft during the N2 seconds. Since the acceleration information in the buffer is referenced to the runway coordinate frame, the changes in position generated by the position converters 228, 230 are also referenced to the runway coordinate frame.

In the example of FIG. 2, the time period N1 is selected to be the longest expected duration of a signal disturbance caused by ILS overflight interference. The time period N2 of FIG. 2 is selected to be sufficiently long to reliably detect the presence of ILS overflight interference. Accordingly, the example time period N2 is shorter than the example time period N1. In some examples, N1 and N2 are further specified such that the difference between N1 and N2 is large enough that an unacceptable inaccuracy in the estimation of the acceleration bias causes enough of a difference in the coasted values for the inaccuracy to be detected.

The example change in position (or the lateral component of the change in position) calculated by the first position converter 228 is combined, via a summer 236, with a lateral position of the aircraft from N1 seconds prior, which is obtained from the buffer 220. The example summer 236 therefore outputs an estimate of the current lateral position of the aircraft based on the position of the aircraft based on ILS observations from N1 seconds prior to the present time, and the change in position over the previous N1 seconds based on integration of the inertial measurements. Similarly, the example change in position calculated by the second position converter 230 is combined, via a summer 238, with a lateral position of the aircraft from N2 seconds prior, which is obtained from the buffer 220. The resulting signal output by the summer 238 is an estimate of the current lateral position of the aircraft based on ILS observations from N2 seconds prior to the present time and the change in position over the previous N2 seconds based on integration of the inertial measurements. The measurement signals output from the example summers 236, 238 are also referred to herein as "coasted" signals, because previous measurements are coasted or propagated forward to the current time.

The example apparatus 200 of FIG. 2 further includes a position selector 240 to receive and select between three measurement signals of the lateral position of the aircraft for guidance. The example apparatus 200 also includes an ILS overflight detector 242 to detect the occurrence of ILS overflight interference. The example position selector 240 receives a first measurement signal from the summer 236 based on the previous N1 seconds of inertial measurement data, a second measurement signal from the summer 238 based on the previous N2 seconds of inertial measurement data, and a most recent ILS lateral deviation measurement signal from the converter 212. The three example measurements received by the position selector 240 are expressed in an identical frame of reference (e.g., the runway reference frame). The example position selector 240 selects one of the three signals to use for guidance. In the example of FIG. 2, the position selector 240 selects a middle (e.g., median) value of the three measurement signals.

Additionally or alternatively, the position selector 240 cross compares the three guidance signals to enable detection of overflight interference before the three guidance signals can be corrupted by the overflight interference. Thus, the example position selector 240 of FIG. 2 is capable of providing an undisturbed guidance signal at all times.

The example position selector 240 may output the selected measurement signal to a flight control system to be used in guiding the aircraft. In the example of FIG. 2, the output of the example position selector 240 (e.g., a rectilinear measurement signal referenced to the runway) is converted back into angular deviations using the inverse of the process used to convert the angular deviations (e.g., the ILS measurements) to rectilinear positions (e.g., the process used by the DDM to lateral distance converter 212). The resulting guidance signal mitigates and/or removes the effects of the ILS overflight interference.

The example ILS overflight detector 242 detects ILS overflight interference by analyzing the most recent N2 ILS lateral deviation measurements. For example, the ILS overflight detector 242 may detect the ILS overflight interference by repeatedly performing mathematical observations (e.g., pattern recognition algorithms) on the previous N2 seconds of stored data. Additionally or alternatively, the ILS overflight detector 242 may compare the inertial measurements to the ILS lateral deviation measurements over the same period to determine if the apparent ILS localizer beam motion is different than the motion of the aircraft as measured by the IMU by more than some threshold amount. As part of the detection process, the example ILS overflight detector 242 may determine the time of the onset of an overflight disturbance.

In the absence of an ILS overflight interference or disturbance, the three measurements received by the position selector 240 of FIG. 2 are within a relatively small tolerance of each other. In the example of FIG. 2, the tolerance corresponds to the accuracy of the acceleration bias error estimate multiplied by $(N1^2)/2$.

At the beginning of the onset of ILS overflight interference, the signal obtained by the position selector 240 from the buffer 220 deviates to a substantially different value from the coasted signals. Accordingly, one of the two coasted signals is selected as the mid value and the signal output from the position selector 240 does not drastically change. The two coasted signals should remain substantially or completely unaffected by the overflight interference for a period of N2 seconds from the beginning of the overflight interference. The example ILS overflight detector 242 monitors the previous N2 seconds of the measurements from the buffer 220 to identify that an overflight disturbance has occurred. If overflight interference is detected, the example position selector overrides a mid-value selection method to select a signal with a full coasting interval of N1 until the total time N1 has passed since the beginning of the overflight disturbance (e.g., the time determined by the ILS overflight detector 242).

The accuracy of the coasted signals depends on the accuracy of the inertial measurements. If there are sensor bias errors in acceleration measurements, the double integration performed by the position converters 228, 230 causes the bias errors to grow exponentially over time. Thus, the corrections to the inertial measurements obtained via the bias estimator 218 improve the accuracy of the coasted signals. For high quality IRUs, acceleration bias errors are known to be relatively stable over the period of many tens of seconds.

The example bias estimator 218 of FIG. 2 estimates the acceleration and/or velocity biases of the acceleration and/or velocity measurements of the IRU 216. To estimate the biases, the bias estimator 218 receives inputs from the GPS transceiver 204 (e.g., a velocity vector having a ground-based reference such as North East Down, East North Up) and from the IRU 216 (e.g., an acceleration vector referenced to the body of the aircraft). The example bias estimator 218 may be implemented using a Kalman filter and/or a complementary filter to estimate the acceleration bias error. Either type of filter may be configured to cause the bias estimator 218 to converge on an estimate of an acceleration bias value that is sufficiently close to the true acceleration bias term. If the acceleration bias value is within an acceptable error, the transformations applied by the position converters 228, 230 to the corrected and coordinate-transformed data do not result in unacceptable error growth. On the other hand, if the bias estimator 218 does not adequately estimate the bias term of the IRU 216, the integration processes performed by the position converters 228, 230 experience unacceptable error growth as a function of the integration interval.

The bias estimator 218 of FIG. 2 may receive copies of the outputs of the summers 236, 238 to determine whether the bias error is greater than a threshold. For example, the bias estimator 218 may compare the coasted signals to determine if the bias error has been adequately estimated. If the two coasted signals differ by more than a threshold amount, then the bias error is too great and/or not adequately estimated. The example bias estimator 218 may generate a deviation signal based on the comparison as feedback to further configure the filter and/or to achieve an adequate bias estimation.

If non-acceleration bias type noise is random and uncorrelated in time, then an integration process performed by the example position converters 228, 230 causes the noise to be small. In the case in which the noise is negligible, an estimate of the acceleration bias term is shown in Equation 1:

$$d_s \approx A_{be} \frac{N_1^2 - N_2^2}{2}, \qquad \text{(Equation 1)}$$

where $d_s$ is the estimator of the acceleration bias term, $A_{be}$ is the residual acceleration bias error remaining after correction by the bias estimator, and N1 and N2 are the times discussed above. However, the observable $d_s$ is confounded by the residual non-bias acceleration noise at the output of the integration processes. Accordingly, the non-acceleration bias noise may be characterized prior to configuration of the bias estimator 218 and/or may be characterized by the bias estimator 218 to update the filter. By characterizing the non-acceleration bias noise, the example bias estimator 218 can set a more accurate threshold for detection of an unacceptable residual bias error.

While the example apparatus 200 of FIG. 2 uses a single buffer 222 to store the acceleration measurements, multiple buffers of different lengths (e.g., N1 seconds, N2 seconds) may be additionally or alternatively used to store the acceleration measurements. In some other examples, the buffer 222 stores more than N1 seconds of data, while the signals are only coasted for N1 seconds and N2 seconds, respectfully. After a detection of overflight interference, the entire buffer 222 can be repeatedly evaluated to determine when the overflight interference has ended. Additionally or alternatively, the buffers 220, 222 may coast the stored samples from a time prior to the time of the onset of overflight interference. In other words, the upper length of an overflight interference event used by the apparatus 200 of FIG. 2 may be longer than N1.

The example apparatus 200 of FIG. 2 further includes a lateral deviation computer 244. The example lateral deviation computer 244 of FIG. 2 obtains the selected position from the position selector 240 and a DDM to lateral distance conversion process and/or parameters from the example DDM to lateral distance converter 212. The lateral deviation computer 244 translates the lateral deviations from the position selector 240 into the angular form (from a rectilinear form) using the same information used to convert the angular measurements of the ILS receiver 202 to rectilinear or lateral distance form. As a result, the contribution of the errors is reduced or canceled.

Figure 3:
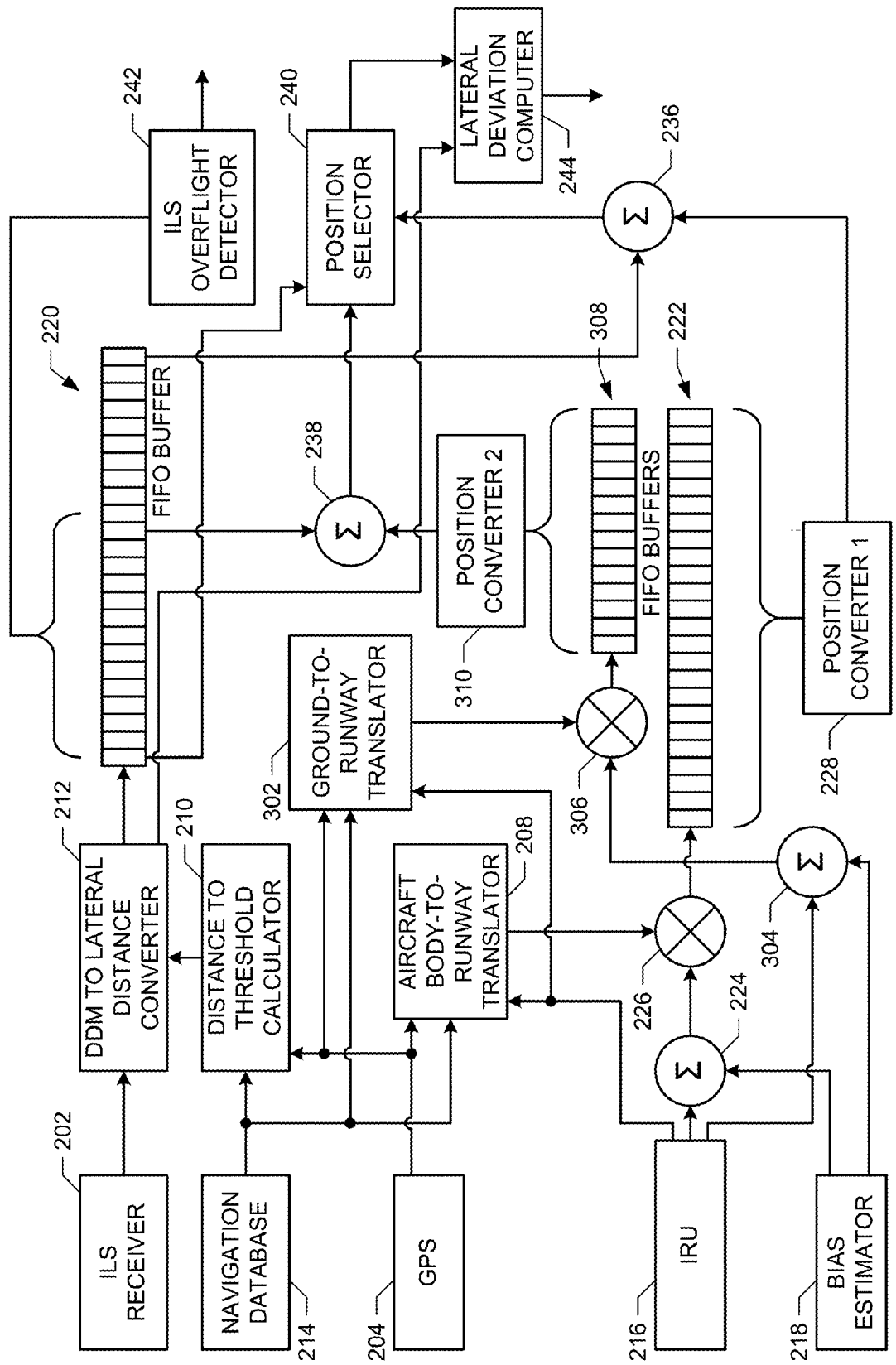
FIG. 3 is a block diagram of another example apparatus to mitigate overflight interference of an instrument landing system.

FIG. 3 is a block diagram of another example apparatus 300 to mitigate overflight interference of an ILS. The example apparatus 300 of FIG. 3 includes an ILS receiver 202, a GPS transceiver 204, an aircraft body-to-runway translator 208, a distance to the threshold calculator 210, a DDM to lateral distance converter 212, a navigation database 214, an IRU 216, a bias estimator 218, buffers 220, 222, a summer 224, a multiplier 226, a position converter 228, summers 236, 238, a position selector 240, and an ILS overflight detector 242. The ILS receiver 202, the GPS transceiver 204, the aircraft body-to-runway translator 208, the distance to the threshold calculator 210, the DDM to lateral distance converter 212, the navigation database 214, the IRU 216, the bias estimator 218, the buffers 220, 222, the summer 224, the multiplier 226, the position converters 228, the summers 236, 238, the position selector 240, the ILS overflight detector 242, and the lateral deviation computer 244 are substantially identical to the respective elements described in FIG. 2 and, thus, are not further discussed to avoid redundant description.

In contrast to the example apparatus 200 of FIG. 2, the example apparatus 300 of FIG. 3 uses velocity measurements generated by the IRU 216 in addition to and/or as an alternative to acceleration measurements. To this end, the example apparatus 300 of FIG. 3 includes a ground-to-runway translator 302, a summer 304, a multiplier 306, a velocity buffer 308, and a position converter 310.

The IRU 216 of FIG. 3 measures the velocity of the aircraft with respect to a reference frame fixed the ground (e.g., in a North East Down reference, in an East North Up reference, etc.). Accordingly, the example translator 302 of FIG. 3 produces a transformation matrix that translates the velocity of the aircraft from a ground reference to a runway reference. The ground-to-runway translator 302 of FIG. 3 obtains the runway true heading, the location of the runway, the position of the aircraft, and the inertial measurements (e.g., velocity), and generates a translation matrix from a reference with respect to the body of the aircraft to a reference with respect to the ground. The translator 302 may generate a translation matrix to enable transformation of the inertial measurements from a ground-centric reference (e.g., x, y, z coordinates with respect to the ground) to a runway threshold and/or centerline intersection-centric reference (e.g., x, y, z coordinates with respect to the intersection of the runway threshold and centerline). In addition to estimating acceleration bias, the bias estimator 218 of FIG. 3 estimates a velocity measurement bias of the IRU 216. The summer 304 of FIG. 3 removes the estimated bias (e.g., subtracts a bias value, adds a negative bias value, etc.) from the velocity measurement output by the example IRU 216.

The output of the summer 304 is translated to a runway reference by the multiplier 306 (e.g., by multiplying the velocity measurement vector by the translation matrix from the translator 302).

The multiplier 306 outputs velocity measurements referenced to the runway, which are stored in the buffer 308. The buffer 308 of FIG. 3 is a FIFO buffer that stores the most recent N2 seconds of velocity measurements. As mentioned above, N2 is selected in the illustrated example to be a time period sufficiently long to reliably detect the presence of ILS overflight interference.

The position converter 310 of FIG. 3 converts N2 seconds of velocity measurements stored in the buffer 308 into a change in position. For example, the position converter 310 of FIG. 3 may integrate the velocity measurements over the time period N2 seconds. The summer 238 of FIG. 3 sums the change in position determined by the position determiner 310 with a position measurement from N2 seconds prior obtained from the buffer 220. The summer 238 outputs an estimate of the current lateral position of the aircraft based on the position of the aircraft based on ILS observations from N2 seconds in past and the change in position over the previous N2 seconds based on integration of the inertial measurements to the position selector 240. As a result, the position selector 240 of FIG. 3 is provided with three measurements, where one of the measurements is based on past ILS measurements propagated forward to the present time based on integration of velocity measurements from the IRU 216 instead of being propagated forward based on acceleration measurements.

Figure 4:
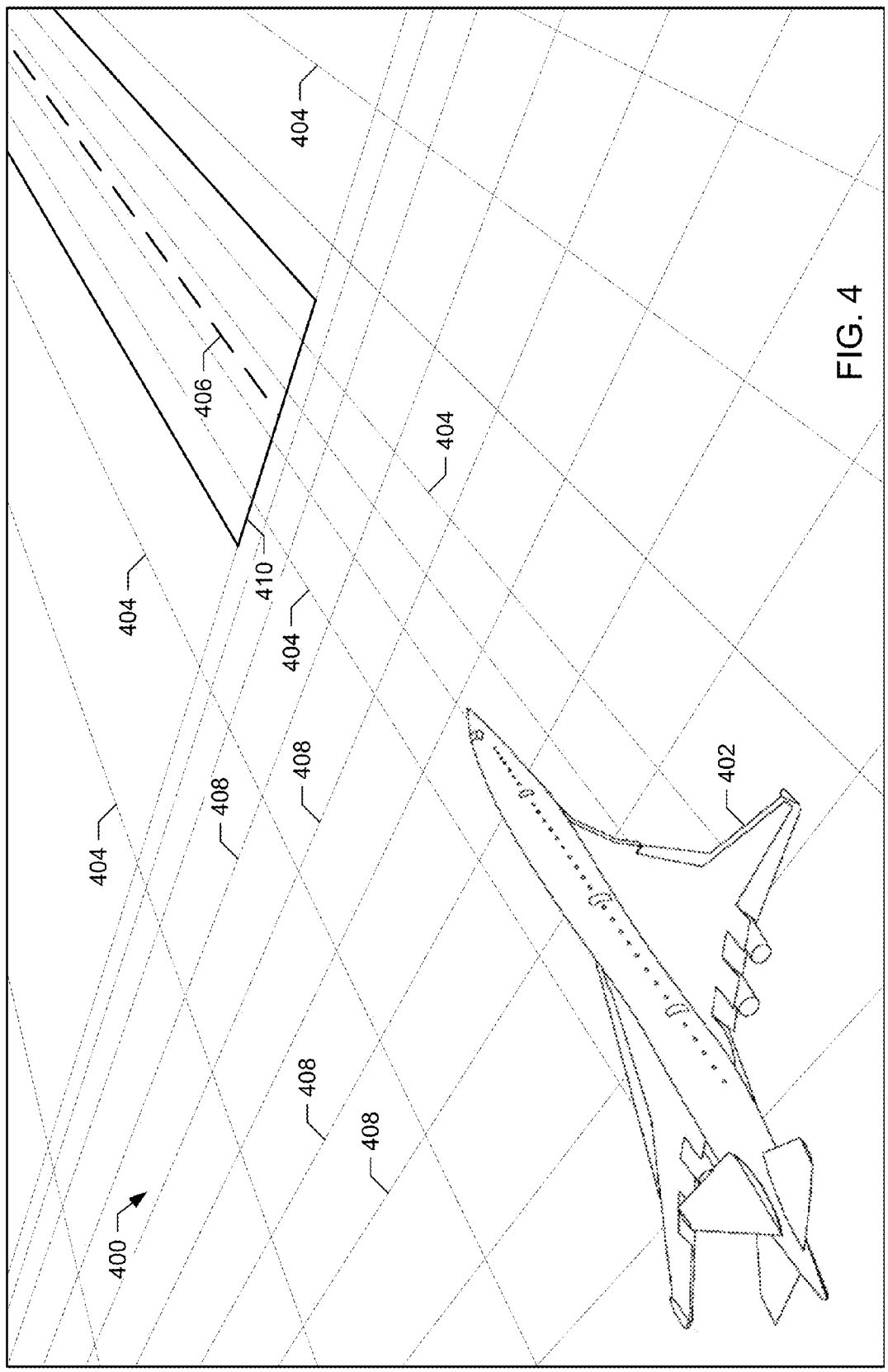
FIG. 4 illustrates an example grid that may be used to determine the position of an aircraft during landing.

FIG. 4 illustrates an example runway coordinate frame 400 that may be used to determine the position of an aircraft 402 during landing. The example navigation database 214 of FIG. 2 may store information used to generate and/or access the coordinate frame 400. The coordinate frame 400 and the position of the aircraft 402 are not illustrated to scale.

The coordinate frame 400 includes lateral deviation grid lines 404 to measure lateral deviation from a runway centerline 406. Additionally, the coordinate frame 400 of FIG. 4 may measure distance lines 408 referenced to a runway threshold 410. The example DDM to lateral distance converter 212, and the position converters 228, 230 of FIG. 2 reference the example coordinate frame 400 to convert angular deviations of the example aircraft 402.

While an example reference coordinate frame 400 is illustrated in FIG. 4, alternative reference grids may be constructed to provide a common reference for lateral deviation.

While example manners of implementing the apparatus 200, 300 have been illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example ILS receiver 202, the example GPS transceiver 204, the example aircraft body-to-runway translator 208, the example distance to the threshold calculator 210, the example DDM to lateral distance converter 212, the example navigation database 214, the example IRU 216, the example bias estimator 218, the example buffers 220, 222, 308, the example summers 224, 236, 238, 304, the example multipliers 226, 306, the example position converters 228, 230, 310, the example position selector 240, the example ILS overflight detector 242, the example lateral deviation computer 244, the example ground-to-runway translator 302, and/or, more generally, the example apparatus 200, 300 of FIGS. 2 and/or 3 may be implemented by hardware, software, firmware and/or any combination of hardware, software and/or firmware. Thus, for example, any of the example ILS receiver 202, the example GPS transceiver 204, the example aircraft body-to-runway translator 208, the example distance to the threshold calculator 210, the example DDM to lateral distance converter 212, the example navigation database 214, the example IRU 216, the example bias estimator 218, the example buffers 220, 222, 308, the example summers 224, 236, 238, 304, the example multipliers 226, 306, the example position converters 228, 230, 310, the example position selector 240, the example ILS overflight detector 242, the example lateral deviation computer 244, the example ground-to-runway translator 302, and/or, more generally, the example apparatus 200, 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example ILS receiver 202, the example GPS transceiver 204, the example aircraft body-to-runway translator 208, the example distance to the threshold calculator 210, the example DDM to lateral distance converter 212, the example navigation database 214, the example IRU 216, the example bias estimator 218, the example buffers 220, 222, 308, the example summers 224, 236, 238, 304, the example multipliers 226, 306, the example position converters 228, 230, 310, the example position selector 240, the example ILS overflight detector 242, the example lateral deviation computer 244, and/or the example ground-to-runway translator 302 are hereby expressly defined to include a tangible computer readable storage medium such as a memory, DVD, CD, Blu-ray, etc. storing the software and/or firmware. Further still, the example apparatus 200, 300 of FIGS. 2 and/or 3 may include one or more elements, processes and/or devices in addition to, or instead of, those illustrated in FIGS. 2 and/or 3, and/or may include more than one of any or all of the illustrated elements, processes and devices.

Flowcharts representative of example methods for implementing the example apparatus 200, 300 of FIGS. 2 and/or 3 are shown in FIGS. 5, 6A, 6B, and 7. In these examples, the methods may be implemented by machine readable instructions comprising programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire programs and/or parts thereof could alternatively be executed by a device other than the processor 1012 and/or embodied in firmware or dedicated hardware. Further, although the example programs are described with reference to the flowcharts illustrated in FIGS. 5-7, many other methods of implementing the example apparatus 200, 300 may alternatively be used. For example, the order of execution of the blocks may be changed, and/or some of the blocks described may be changed, eliminated, or combined.

As mentioned above, the example methods of FIGS. 5-7 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example methods of FIGS. 5-7 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium and to exclude propagating signals. As used herein, when the phrase "at least" is used as the transition term in a preamble of a claim, it is open-ended in the same manner as the term "comprising" is open ended.

Figure 5:
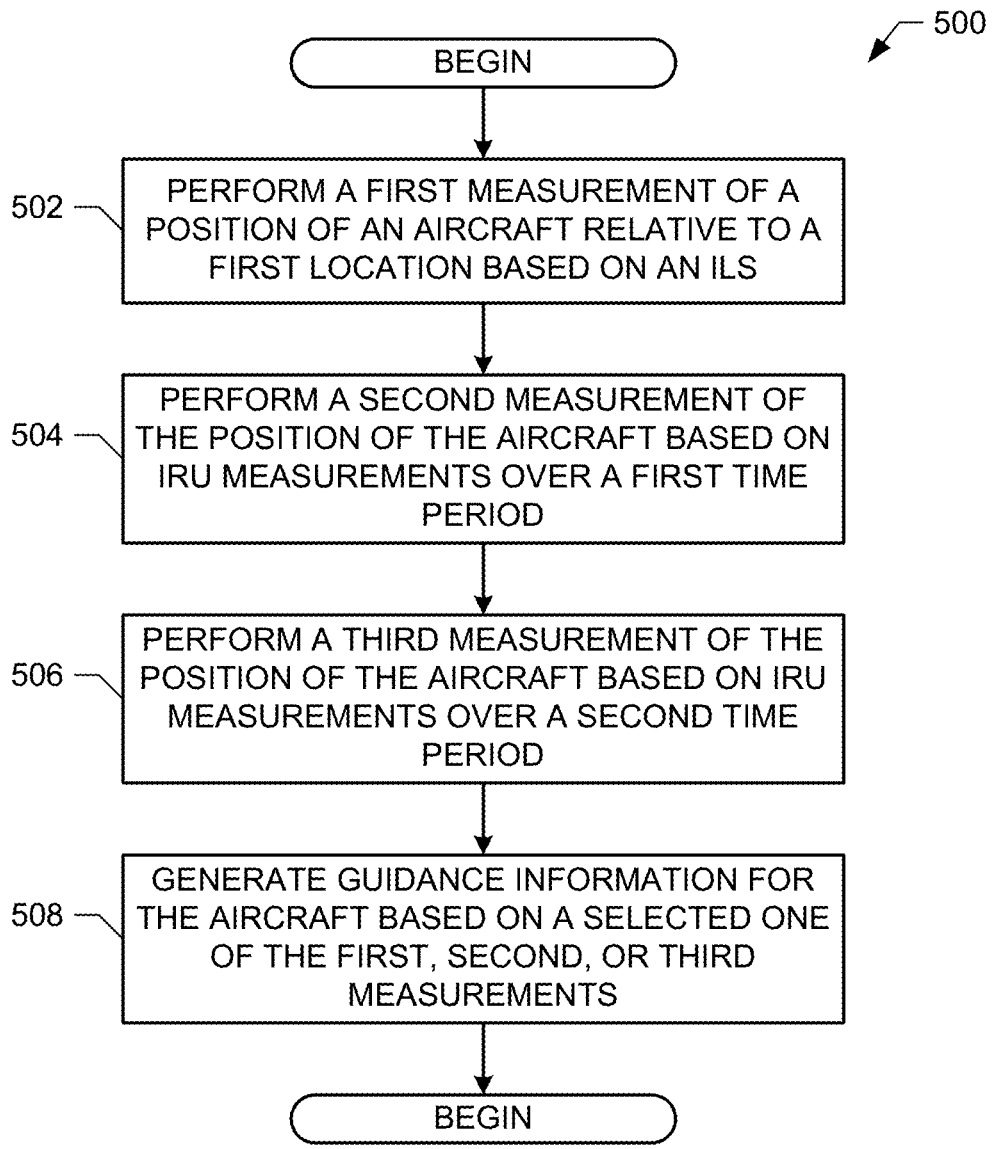
FIG. 5 is a flowchart representative of an example method to generate aircraft guidance information.

FIG. 5 is a flowchart representative of an example method 500 to generate aircraft guidance information. The example instructions 500 may be performed by the example apparatus 200 and/or 300 of FIGS. 2 and/or 3 to mitigate the effects of ILS overflight interference on aircraft guidance.

The example apparatus 200 performs a first measurement of a position of an aircraft (e.g., an aircraft in which the apparatus 200 is installed or otherwise implemented) relative to a first location based on an ILS (block 502). For example, the ILS receiver 202 of FIG. 2 may receive an ILS localizer signal, which is converted by the DDM to lateral distance converter 212 to a lateral distance of the aircraft from a runway centerline.

The example apparatus 200 of FIG. 2 performs a second measurement of the position of the aircraft based on IRU measurements over a first time period (block 504). For example, the IRU 216 of FIG. 2 may generate acceleration measurements for a first time period (e.g., N1 seconds) prior to the first measurement based on the ILS. The example acceleration measurements may be corrected for acceleration bias (e.g., via the bias estimator 218) and converted to a consistent reference coordinate system (e.g., to a common reference coordinate system with the ILS position measurements, to a runway reference frame, etc.). The position converter 228 converts the acceleration measurements for the first time period to a change in position of the aircraft over the first time period. The example change in position is combined with a position measurement performed at the beginning of the first time period (e.g., N1 seconds prior). The combination results in a second measurement of the position of the aircraft at substantially the same time as the ILS-based measurement of block 502.

The example apparatus 200 of FIG. 2 performs a third measurement of the position of the aircraft based on IRU measurements over a second time period (block 506). For example, the IRU 216 of FIG. 2 may generate velocity and/or acceleration measurements for a second time period (e.g., N2 seconds) prior to the first measurement based on the ILS. The example acceleration measurements may be corrected for velocity and/or acceleration bias (e.g., via the bias estimator 218) and converted to a consistent reference coordinate system (e.g., to a common reference coordinate system with the ILS position measurements). The position converter 230 converts the acceleration and/or velocity measurements for the second time period to a change in position of the aircraft over the second time period. The example change in position is combined with a position measurement performed at the beginning of the second time period (e.g., N2 seconds prior). The combination results in a second measurement of the position of the aircraft at substantially the same time as the ILS-based measurement of block 502 and/or the IRU based measurement of block 504.

The example apparatus 200 generates guidance information for the aircraft based on a selected one of the first, second, or third measurements (block 508). For example, the position selector 240 of FIG. 2 selects between the first, second, and third measurements to use as the position of the aircraft to generate guidance information. In some examples, the position selector 240 selects a middle one of the three position values. However, the position selector 240 may select between the position measurements using any other criteria that results in the selection of a signal that has not been corrupted by ILS overflight interference.

Figure 6A:
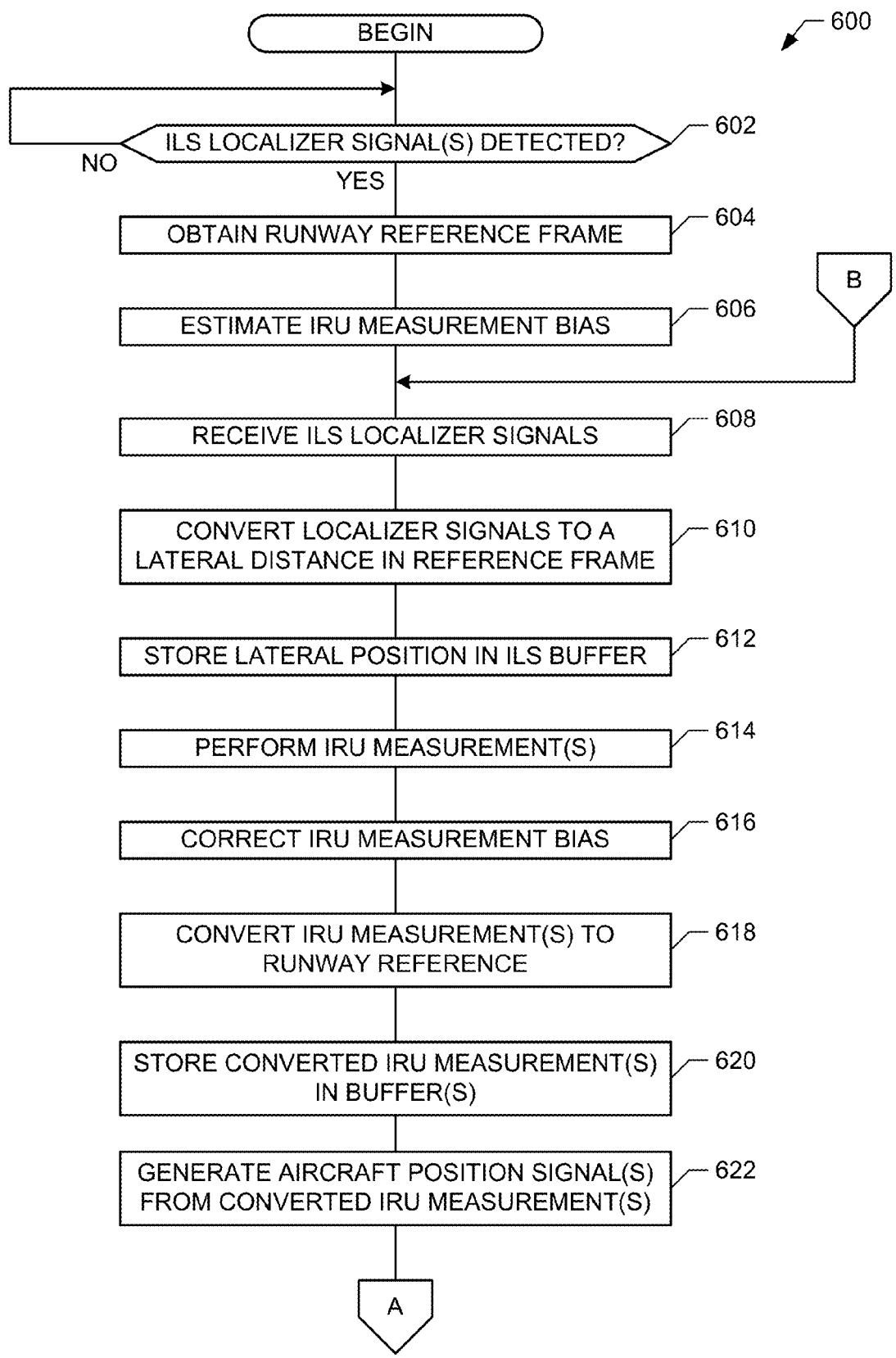
FIGS. 6A and 6B show a flowchart representative of an example method to mitigate and/or detect ILS overflight interference.
Figure 6B:
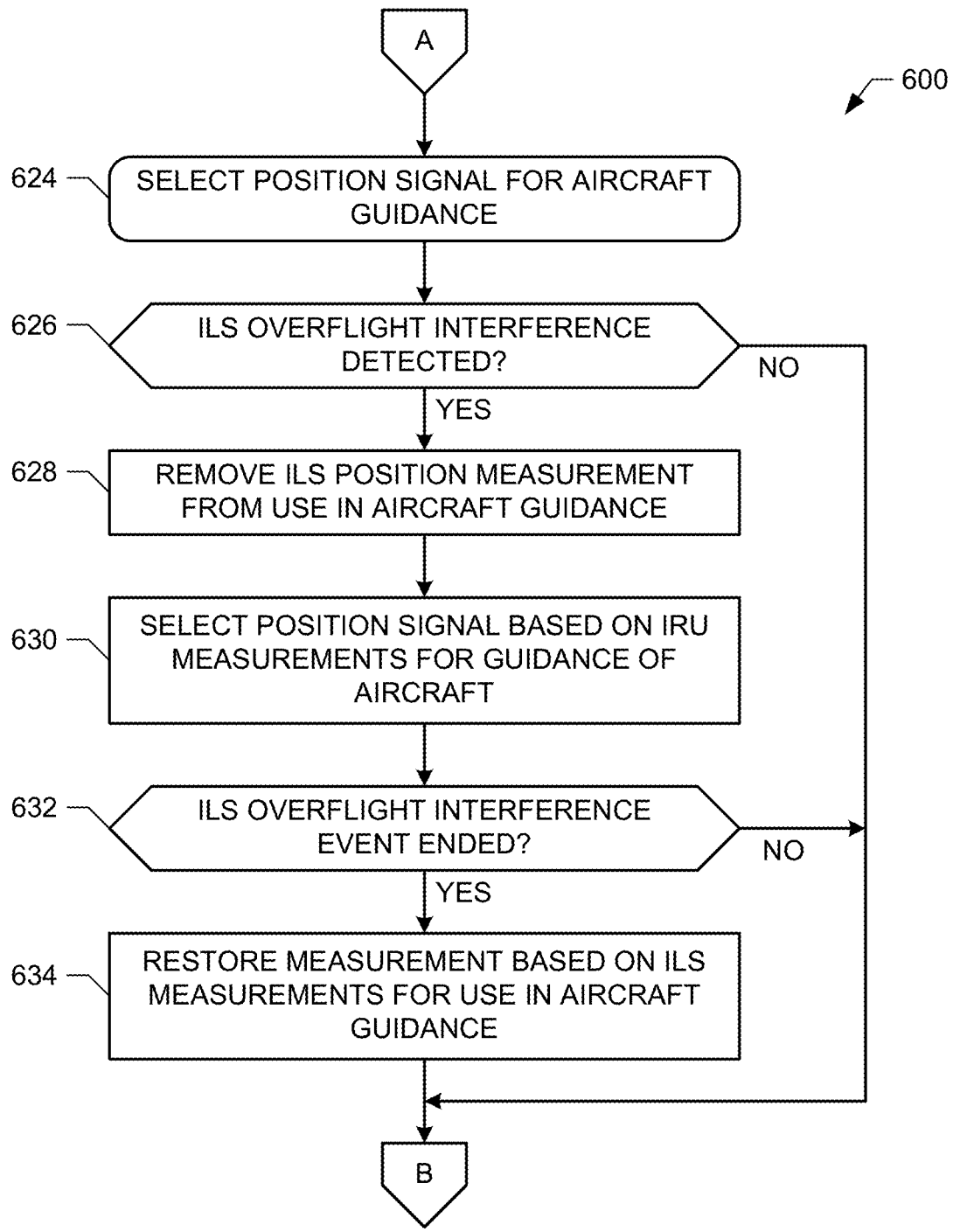

FIGS. 6A and 6B show a flowchart representative of an example method 600 to mitigate and/or detect ILS overflight interference. The example method 600 of FIGS. 6A and 6B may be implemented using the example apparatus 200 and/or 300 of FIGS. 2 and/or 3.

The ILS receiver 202 of FIG. 2 determines whether an ILS localizer signal(s) are detected (block 602). For example, the ILS receiver 202 may detect localizer signals when an aircraft is approaching a runway for landing. If ILS localizer signals are not detected (block 602), control iterates to block 602 until ILS localizer signals are detected. When an ILS localizer signal is detected (block 602), the example distance to threshold calculator 210 and/or the translators 208, 302 of FIGS. 2 and/or 3 obtains a runway reference frame (block 604). The example reference frame is based on the location and orientation of the runway, and may be obtained from the navigation database 214 of FIG. 2 as, for example, two or more points defining the runway centerline and/or the threshold.

The example bias estimator 218 of FIG. 2 estimates an IRU measurement bias (block 606). For example, the bias estimator 218 may apply a Kalman or complementary filter to a combination of GPS and IRU measurements to determine an acceleration bias and/or a velocity bias of measurements from the IRU 216.

The example ILS receiver 202 receives ILS localizer signals (block 608). The ILS localizer signals received by the ILS receiver 202 are representative of a lateral deviation of the aircraft with respect to the runway centerline. The DDM to lateral distance converter 212 of FIG. 2 converts the localizer signals to a lateral position with respect to the reference frame (block 610). The FIFO buffer 220 stores the position or lateral distance (block 612). Storing the lateral distance causes the buffer 220 to remove the oldest lateral distance sample stored in the buffer 220.

The IRU 216 of FIG. 2 performs IRU measurement(s) (block 614). For example, the IRU 216 may measure an acceleration of the aircraft (e.g., with reference to the aircraft body) and/or a velocity of the aircraft (e.g., with reference to the ground). The bias estimator 218 and/or the summers 224, 304 of FIGS. 2 and/or 3 correct any IRU measurement bias in the IRU measurements (block 616). The translators 208, 302 and/or the multipliers 226, 306 of FIGS. 2 and/or 3 convert the IRU measurement(s) to a runway reference (e.g., to the reference grid) (block 618). The converted IRU measurements are stored in respective buffer(s) (block 620). For example, acceleration measurement(s) are stored in the buffer 222 and/or velocity measurement(s) are stored in the buffer 308. Storing the measurements in the FIFO buffer(s) 222, 308 causes the buffer(s) 222, 308 to remove the oldest sample(s) from each of the respective buffer(s) 222, 308.

The apparatus 200 generates aircraft position measurement(s) from the converted IRU measurement(s) stored in the buffer(s) 222, 308 (block 622). For example, the position converters 228, 230, 310 integrate the converted IRU measurement(s) to obtain measured change(s) in position of the aircraft. The summers 236, 238 sum the measured change(s) in position with corresponding past measurements of position of the aircraft (e.g., the ILS measurements stored in the buffer 220) that have been propagated forward. The summers 236, 238 output position signals.

The example apparatus 200 selects a position signal to generate aircraft guidance information (block 624). For example, the position selector 240 of FIGS. 2 and/or 3 may select from multiple measurements of the position of the aircraft. The example measurements from which the position selector 240 selects are derived from the ILS receiver 202 and the IRU 216. A method that may be performed to implement block 624 are described below with reference to FIG. 7.

The example ILS overflight detector 242 of FIGS. 2 and/or 3 determines whether ILS overflight interference is detected (block 626). For example, the ILS overflight detector 242 may detect a signature representative of ILS interference from the signal(s) received at the ILS receiver 202 over a period of time. If ILS overflight interference is not detected (block 626), control returns to block 608.

If ILS overflight interference is detected (block 626), the ILS overflight detector 242 and/or the position selector 240 of FIGS. 2 and/or 3 remove ILS position measurement(s) (e.g., ILS-only position measurements in the buffer 220) from use in aircraft guidance (FIG. 6B, block 628). The position selector 240 selects position signals based on IRU measurements for guidance of the aircraft (e.g., without considering ILS-only measurements). In some examples, the position selector 240 may use the same methods as in block 624. In some other examples, the position selector 240 may use a different method to select a position signal without the use of ILS measurements. For example, the ILS-based position measurement may be considered for aircraft guidance, but effectively removed from consideration as an aircraft guidance signal based on aircraft position signal selection rules.

The ILS overflight detector 242 determines whether the ILS overflight interference event has ended (block 632). In some examples, the ILS overflight detector 242 waits a threshold amount of time (e.g., N1 seconds), after which the ILS interference is expected or predicted to have ended. In some other examples, the ILS overflight detector 242 continues to monitor the ILS signals to determine whether the ILS interference event has ended (e.g., an overflight interference signature is no longer present in the ILS signals). If the ILS overflight interference event has ended (block 632), the example ILS overflight detector 242 and/or the example position selector 240 restore the measurement based on the current ILS measurements for use in aircraft guidance (block 624). After restoring the measurement for use in guidance (block 624), or if the ILS overflight interference event has not ended (block 632), control returns to block 608 of FIG. 6A to continue measuring the position of the aircraft. Additionally, while the ILS overflight interference remains, the example block 626 continues to pass control to blocks 628-634 of FIG. 6B.

Figure 7:
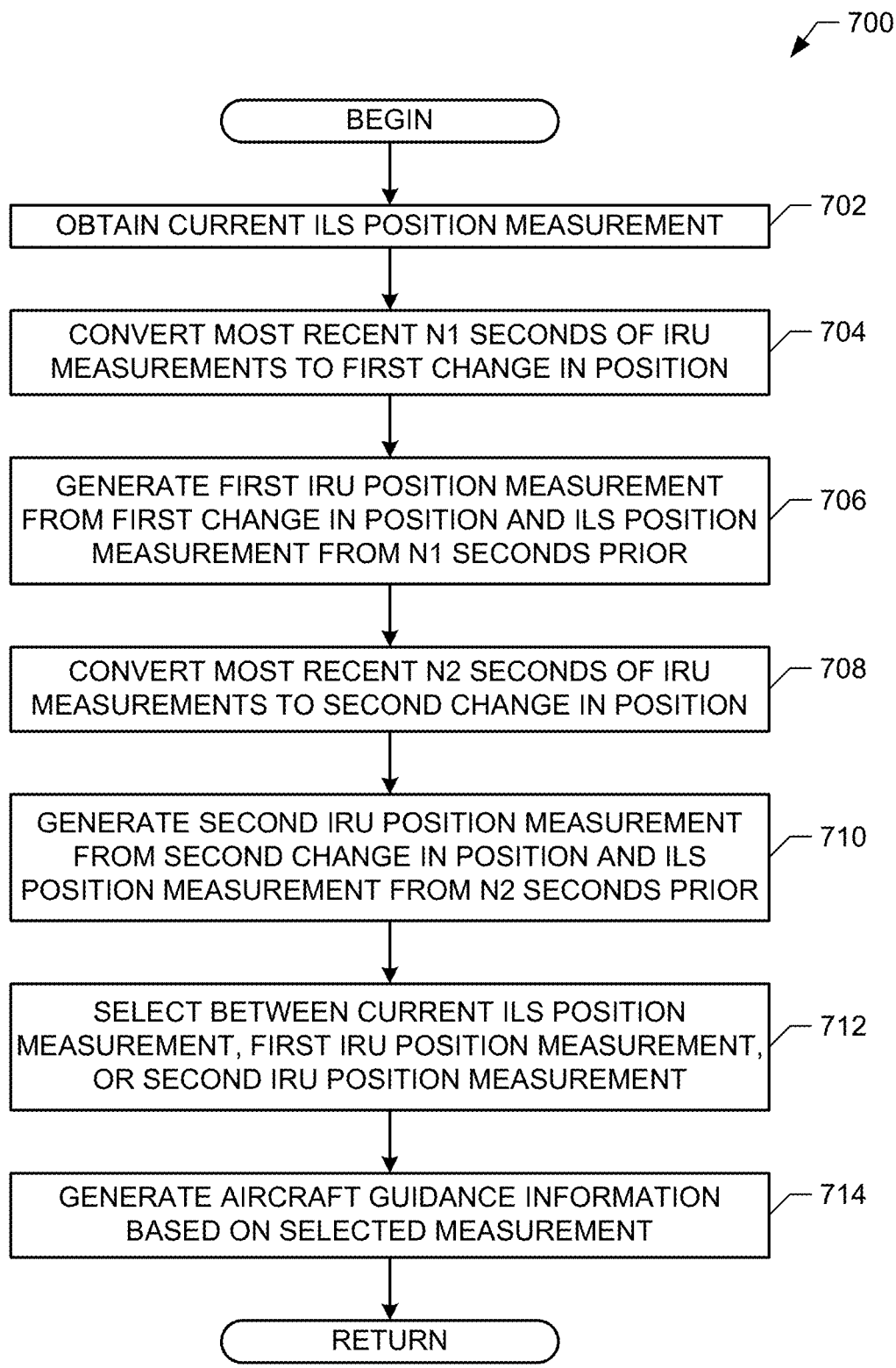
FIG. 7 is a flowchart representative of an example method to select a position signal for aircraft guidance.

FIG. 7 is a flowchart representative of an example method 700 to select a position signal for aircraft guidance. The example method 700 of FIG. 7 may be implemented using the example apparatus 200 and/or 300 of FIGS. 2 and/or 3 to implement block 622 of FIG. 6.

The position selector 240 of FIGS. 2 and/or 3 obtains a current (e.g., most recent) ILS position measurement (block 702). For example, the position selector 240 may obtain the most recent measurement from the buffer 220 of FIGS. 2 and/or 3.

The position converter 228 of FIGS. 2 and/or 3 converts the most recent N1 seconds of IRU measurements to a first change in position (block 704). For example, the position converter 228 may receive N1 seconds worth of aircraft acceleration samples from the buffer 222 and double integrate the samples over the N1 seconds (e.g., perform an integration of the acceleration measurements over the N1 seconds, and then perform an integration of the results of the first integration over the N1 seconds) to obtain a change in position of the aircraft over the N1 seconds. The summer 236 of FIGS. 2 and/or 3 generates a first IRU position measurement from the first change in position and an ILS position measurement from N1 seconds prior to the most recent ILS position measurement (e.g., an ILS position measurement coasted forward N1 seconds to the present time) (block 706). Thus, the first example IRU position measurement is a measurement of the change in position of the aircraft over the prior N1 seconds.

The position converter 230, 310 of FIGS. 2 and/or 3 converts the most recent N2 seconds of IRU measurements to a second change in position (block 708). For example, the position converter 230 of FIG. 2 may receive N2 seconds of aircraft acceleration samples from the buffer 222 and double integrate the samples over the N2 seconds (e.g., perform an integration of the acceleration measurements over the N2 seconds, and then perform an integration of the results of the first integration over the N2 seconds) to obtain a change in position of the aircraft over the N2 seconds. In some other examples, the position converter 310 of FIG. 3 may receive N2 seconds of aircraft velocity samples from the buffer 308 and integrate the samples over the N2 seconds to obtain a change in position of the aircraft over the N2 seconds. The summer 238 of FIGS. 2 and/or 3 generates a second IRU position measurement from the second change in position and an ILS position measurement from N2 seconds prior to the most recent ILS position measurement (e.g., an ILS position measurement coasted forward N2 seconds to the present time) (block 710). Thus, the second IRU position measurement is a measurement of the change in position of the aircraft over the prior N2 seconds.

The position selector 240 of FIGS. 2 and/or 3 selects between the current ILS position measurement, the first IRU position measurement, or the second IRU position measurement (block 712). In some examples, the position selector 240 selects the measurement having the middle (e.g., median) value of the three measurements. Based on the selected measurement, the example position selector 240 generates aircraft guidance information (block 714). For example, the position selector 240 may generate aircraft guidance information to maintain the aircraft on a consistent course during an ILS overflight interference event to avoid undesired deviations in the path of the aircraft. The example instructions 700 may then end and control returns to block 624 of FIG. 6A.

Figure 8:
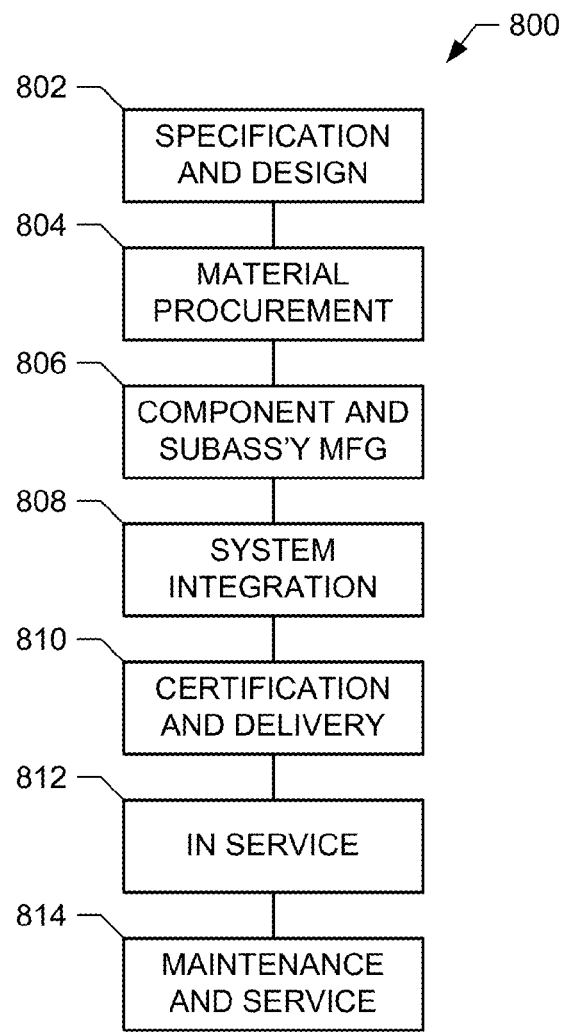
FIG. 8 is a flowchart of platform production and service methodology.
Figure 9:
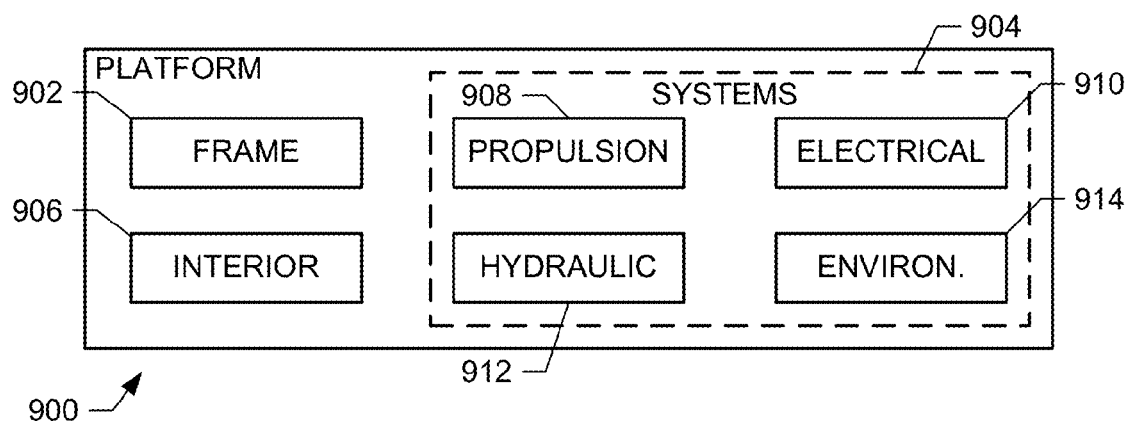
FIG. 9 is a block diagram of a platform.

Examples of the disclosure may be described in the context of a platform manufacturing and service method 800 as shown in FIG. 8 and a platform 900, such as an aircraft, as shown in FIG. 9. During pre-production, the example method 800 may include specification and design (block 802) of the platform 900 (e.g., an aircraft). Preproduction may further include material procurement (block 804). During production, component and subassembly manufacturing (block 806) and system integration (block 808) of the platform 900 (e.g., an aircraft) takes place. During component and subassembly manufacturing (block 806) and/or system integration (block 808), apparatus 200, 300 of FIGS. 2 and/or 3 may be implemented into aircraft guidance and/or measurement systems (e.g., into software and/or hardware). Thereafter, the platform 900 (e.g., an aircraft) may go through certification and delivery (block 810) in order to be placed in service (block 812). While in service by a customer, the platform 900 (e.g., an aircraft) is scheduled for routine maintenance and service (block 814), which may also include modification, reconfiguration, refurbishment, etc.

Each of the operations of the example method 800 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 9, the platform 900 (e.g., an aircraft) produced by example method 800 may include a frame 902 with a plurality of systems 904 and an interior 906. Examples of high-level systems 904 include one or more of a propulsion system 908, an electrical system 910, a hydraulic system 912, and an environmental system 914. The example systems and methods disclosed herein may be integrated into the example systems 904, 908, 910, 912, 914. Any number of other systems may be included.

Apparatus and methods embodied herein may be employed during any one or more of the stages of the production and service method 800. For example, components or subassemblies corresponding to production process 806 may be fabricated or manufactured in a manner similar to components or subassemblies produced while the platform 900 (e.g., an aircraft) is in service 812. Also, one or more apparatus embodiments, method embodiments, or a combination thereof may be implemented during the production stages 806 and 808, for example, by substantially expediting assembly of or reducing the cost of a platform 900 (e.g., an aircraft).

Similarly, one or more of apparatus embodiments, method embodiments, or a combination thereof may be utilized while the platform 900 (e.g., spacecraft) is in service 812, for example and without limitation, to maintenance and service 814.

Figure 10:
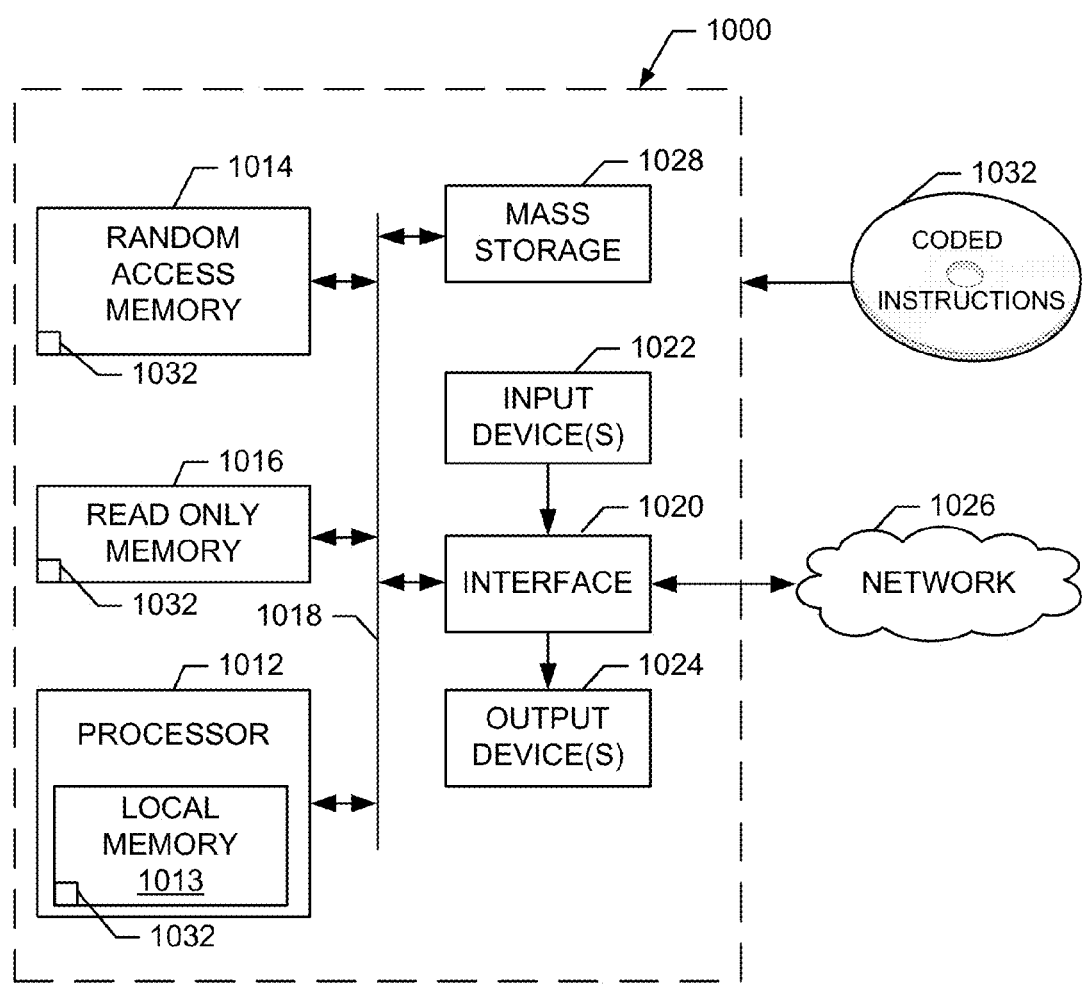
FIG. 10 is a block diagram of an example processor platform that may be used to implement the methods and apparatus described herein.

FIG. 10 is a block diagram of an example processor platform 1000 to implement the methods of FIGS. 5-7 and/or to implement the systems 200, 300 of FIGS. 2 and/or 3. The processor platform 1000 can be, for example, a server, a navigation computer, or any other type of computing device or combination of computing devices.

The processor platform 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a voice recognition system, and/or any other method of input or input device.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a wireless local area network (WLAN) connection, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the navigation database 214 of FIGS. 2 and/or 3.

Coded instructions 1032 to implement the methods of FIGS. 5-7 may be stored in the mass storage device 1028, in the volatile memory 1014, in the non-volatile memory 1016, and/or on a removable storage medium such as a CD or DVD.

Although certain example apparatus and methods have been described herein, the scope of coverage of this disclosure is not limited thereto. On the contrary, this disclosure covers all apparatus and methods fairly falling within the scope of the appended claims.

What is claimed is:

1. A method, comprising:
performing, using a processor, a first measurement of a position of an aircraft relative to a first location based on an instrument landing system;
performing, using the processor, a second measurement of the position of the aircraft based on inertial measurements performed over a first time period occurring prior to the first measurement;
performing, using the processor, a third measurement of the position of the aircraft based on inertial measurements performed over a second time period greater than the first time period and occurring prior to the first measurement; and
generating, using the processor, guidance information based on a selected one of the first, second, or third measurements of the position of the aircraft.

2. The method as defined in claim 1, further comprising converting the first measurement of the position to a rectilinear coordinate system.

3. The method as defined in claim 2, wherein performing the first measurement of the position of the aircraft comprises converting a change in position of the aircraft to the rectilinear coordinate system.

4. The method as defined in claim 1, wherein performing the second measurement of the position of the aircraft comprises converting the inertial measurements performed over the first time period to a change in position.

5. The method as defined in claim 4, wherein converting the inertial measurements comprises performing an integration of the inertial measurements.

6. The method as defined in claim 1, wherein performing the third measurement of the position of the aircraft comprises converting the inertial measurements performed over the second time period to a change in position.

7. The method as defined in claim 1, wherein the first time period comprises a minimum amount of time to detect overflight interference of the instrument landing system.

8. The method as defined in claim 1, wherein determining a first position of an aircraft comprises:
converting angular lateral deviation measurements from the instrument landing system to rectilinear coordinates; and
determining the first position relative to an intersection of a runway threshold and a runway centerline.

9. The method as defined in claim 1, further comprising performing inertial measurements using an inertial reference unit and correcting the inertial measurements by removing bias errors, the second and third measurements being based on corrected inertial measurements occurring prior to the first measurement.

10. The method as defined in claim 9, further comprising converting the second and third measurements to a rectilinear coordinate system.

11. The method as defined in claim 1, further comprising analyzing measurements of lateral deviation based on the instrument landing system for the first time period to detect interference with signals received from the instrument landing system.

12. An apparatus, comprising:
an instrument landing system to perform a first measurement of a position of an aircraft relative to a first location;
an inertial reference unit to perform inertial measurements of a change in location of the aircraft; and
a position selector to select between the first measurement, a second measurement of the position of the aircraft based on the inertial measurements over a first time period occurring prior to the first measurement, and a third measurement of the position of the aircraft based on the inertial measurements performed over a second time period greater than the first time period and occurring prior to the first measurement, and to generate guidance information based on a selected one of the first, second, or third measurements of the position of the aircraft.

13. The apparatus as defined in claim 12, further comprising a bias estimator to estimate a measurement bias of the inertial measurements.

14. The apparatus as defined in claim 13, wherein the bias estimator is to estimate the measurement bias based on satellite-based guidance.

15. The apparatus as defined in claim 12, further comprising a reference grid generator to generate a reference grid with respect to a runway, the first, second, and third measurements to be expressed based on the reference grid.

16. The apparatus as defined in claim 12, further comprising a buffer to store a plurality of inertial measurements.

17. The apparatus as defined in claim 16, further comprising a position converter to convert at least a portion of the inertial measurements stored in the buffer to a calculated change in position of the aircraft over the first time period.

18. The apparatus as defined in claim 17, further comprising a summer to generate the second measurement of the position of the aircraft based on the calculated change in position of the aircraft over the first time period and a measured position of the aircraft at a beginning of the first time period.

19. A computer readable storage medium comprising machine readable instructions which, when executed, cause a processor to:
perform a first measurement of a position of an aircraft relative to a first location based on an instrument landing system;
perform a second measurement of the position of the aircraft based on inertial measurements performed over a first time period occurring prior to the first measurement;
perform a third measurement of the position of the aircraft based on inertial measurements performed over a second time period greater than the first time period and occurring prior to the first measurement; and
generate guidance information based on a selected one of the first, second, or third measurements of the position of the aircraft.

20. The storage medium as defined in claim 19, wherein the instructions are to cause the processor to perform the second measurement of the position of the aircraft by converting the inertial measurements performed over the first time period to a change in position.

* * * * *